(12) United States Patent
Zhu et al.

(10) Patent No.: US 10,074,928 B1
(45) Date of Patent: Sep. 11, 2018

(54) CABLE CONNECTING ASSEMBLY

(71) Applicant: AMPHENOL FIBER OPTIC TECHNOLOGY (SHENZHEN) CO., LTD., Shenzhen (CN)

(72) Inventors: Linghua Zhu, Shenzhen (CN); Songsheng Li, Shenzhen (CN); Anh Nguyen, Shenzhen (CN)

(73) Assignee: Amphenol Fiber Optic Technology (Shenzhen) Co., Ltd., Shenzhen, Guangdong Province (CN)

( * ) Notice: Subject to any disclaimer, the term of this patent is extended or adjusted under 35 U.S.C. 154(b) by 0 days.

(21) Appl. No.: 15/849,153

(22) Filed: Dec. 20, 2017

(30) Foreign Application Priority Data

Aug. 30, 2017 (TW) .............. 106212816 U

(51) Int. Cl.
| | |
|---|---|
| *H01R 13/11* | (2006.01) |
| *H01R 13/52* | (2006.01) |
| *H02G 15/013* | (2006.01) |
| *H01R 13/59* | (2006.01) |
| *H01R 25/00* | (2006.01) |
| *H01R 13/436* | (2006.01) |

(52) U.S. Cl.
CPC ....... *H01R 13/5202* (2013.01); *H01R 13/436* (2013.01); *H01R 13/59* (2013.01); *H01R 25/003* (2013.01); *H02G 15/013* (2013.01)

(58) Field of Classification Search
CPC .............. H01R 13/5202; H01R 9/0524; H01R 143/26; H01R 13/436; H01R 25/003; H01R 13/59; H02G 15/013
See application file for complete search history.

(56) References Cited

U.S. PATENT DOCUMENTS

| | | | |
|---|---|---|---|
| 2005/0037656 A1* | 2/2005 | Cairns ................. | G02B 6/3816 439/353 |
| 2014/0342594 A1* | 11/2014 | Montena .............. | H01R 9/0524 439/359 |
| 2015/0362030 A1* | 12/2015 | Choi ...................... | F16D 65/14 188/2 D |
| 2016/0312558 A1* | 10/2016 | Cavalheiro ............... | E02D 1/04 |
| 2017/0218718 A1* | 8/2017 | Cavalheiro ........... | E21B 33/068 |
| 2017/0242198 A1* | 8/2017 | Zhu ....................... | G02B 6/3825 |
| 2018/0062282 A1* | 3/2018 | Chastain ................ | H01R 43/26 |

* cited by examiner

*Primary Examiner* — Jean F Duverne

(74) *Attorney, Agent, or Firm* — Muncy, Geissler, Olds & Lowe, P.C.

(57) ABSTRACT

A cable connecting assembly includes a barrel member, a tubular member partially received in the barrel member, a securing member, and a seal unit. The tubular member includes a head part and a hollow tail part. The head part defines a receiving space adapted to receive an end portion of the cable therein. The tail part is connected to the head part, is adapted for a neck portion of the cable to extend therethrough, and is curved to extend in a direction transverse to the lengthwise direction. The tail part includes two body halves removably coupled to each other. The securing member has a through hole permitting extension of the tail part. The seal unit is sleeved on the head part and sealingly contacts an inner surface of the barrel member.

7 Claims, 5 Drawing Sheets

CABLE CONNECTING ASSEMBLY

CROSS-REFERENCE TO RELATED APPLICATION

This application claims priority of Taiwanese Utility Model Patent Application No. 106212816, filed on Aug. 30, 2017.

FIELD

The disclosure relates to a connecting assembly, and more particularly to a cable connecting assembly.

BACKGROUND

Referring to FIGS. 1 and 2, a conventional cable connecting assembly 1 is used for connecting a cable 2, and includes a barrel member 11, a tubular member 12, a connect ring 13, a securing member 14, and a seal ring 15. The barrel member 11 has a hollow main body 111 that has opposite first and second end portions 101, 102, and an external threaded portion 112 that extends from the first end portion 101 away from the second end portion 102 and that is for connecting the cable 2 to another cable or other device (not shown). The second end portion 102 is formed with an internal thread 118. The main body 111 and the external threaded portion 112 cooperatively define an accommodating space 110. The tubular member 12 is disposed in the accommodating space 110, and defines a receiving space 120 for receiving the cable 2 therein. The connect ring 13 abuts against an end of the tubular member 12 which is adjacent to the second end portion 102 of the barrel member 11. The securing member 14 has an abutment portion 141 that abuts against the second end portion 102 of the barrel member 11, and a coupling portion 142 that abuts against the connect ring 13 and that is formed with an external thread threadedly engaging the internal thread 118 of the second end portion 102 of the barrel member 11. The abutment portion 141 and the coupling portion 142 of the securing member 14 cooperatively form a through hole 140 in spatial communication with the receiving space 120. The seal ring 15 is sleeved on the coupling portion 142 of the securing member 14, and sealingly contacts an inner surface of the main body 111 of the barrel member 11 and the abutment portion 141 of the securing member 14, so as to prevent water or moisture in the air from entering into the accommodating space 110 and the receiving space 120.

However, when the conventional cable connecting assembly 1 is used for connecting the cable 2 in a relatively humid environment, the conventional cable connecting assembly 1 may not able to completely prevent water or moisture in the air from entering the accommodating space 110 and the receiving space 120 even if the securing member 14 is screwed to tightly abut against the connect ring 13. As a result, the cable 2 is easily damaged due to contact with water or moisture. In addition, the conventional cable connecting assembly 1 is not suitable for connecting the cable 2 in a winding path.

SUMMARY

Therefore, an object of the disclosure is to provide a cable connecting assembly that can alleviate at least one of the drawbacks of the prior art.

According to the disclosure, the cable connecting assembly is for being connected to a cable. The cable connecting assembly includes a barrel member, a tubular member, a securing member, and a seal unit.

The barrel member defines an accommodating space that extends in a lengthwise direction, and includes a main body and an extending body. The main body has a first end portion, and a second end portion opposite to the first end portion in the lengthwise direction and being formed with an internal thread. The extending body extends from the first end portion away from the second end portion. The accommodating space extends through the extending body and the main body.

The tubular member includes a head part and a hollow tail part. The head part defines a receiving space adapted to receive an end portion of the cable therein, and has an outer surface formed with two annular grooves spaced apart from each other in the lengthwise direction. The tail part is connected to an end of the head part, is adapted for a neck portion of the cable which is connected to the end portion to extend therethrough, and is curved to extend in a direction transverse to the lengthwise direction. The tail part includes two body halves that are removably coupled to each other.

The securing member has a coupling portion and an abutment portion. The coupling portion has an external thread threadedly engaging the internal thread of the main body of the barrel member, and abuts against the tubular member. The abutment portion is connected to the coupling portion, is located outside of the accommodating space, abuts against the second end portion of the main body, and cooperates with the coupling portion to form a through hole extending in the lengthwise direction and permitting extension of the tail part of the tubular member therethrough.

The seal unit includes two seal rings that are respectively disposed in the annular grooves of the tubular member, and that sealingly contact an inner surface of the main body of the barrel member.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
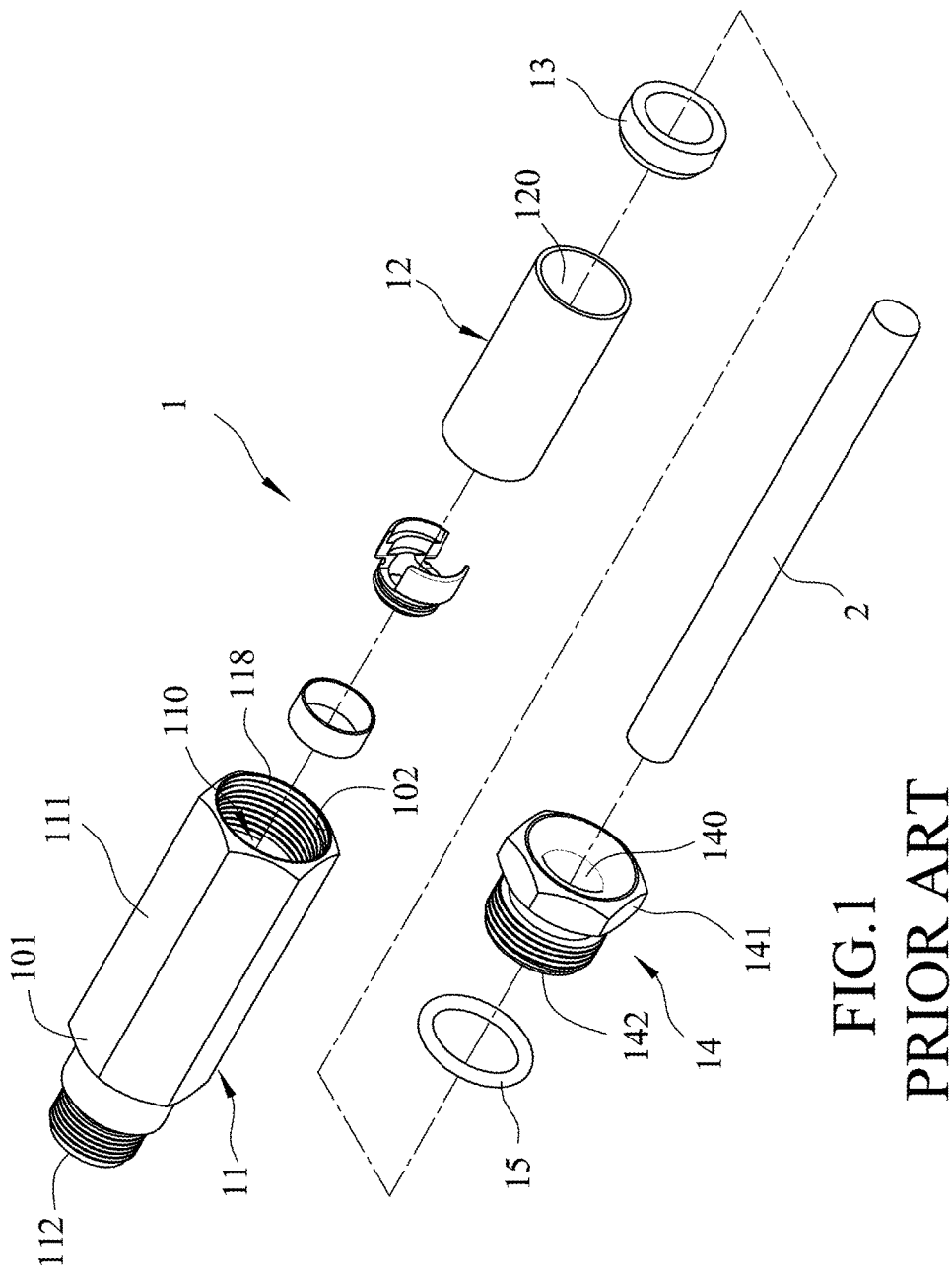
FIG. 1 is an exploded perspective view illustrating a conventional cable connecting assembly and a cable.
Figure 2:
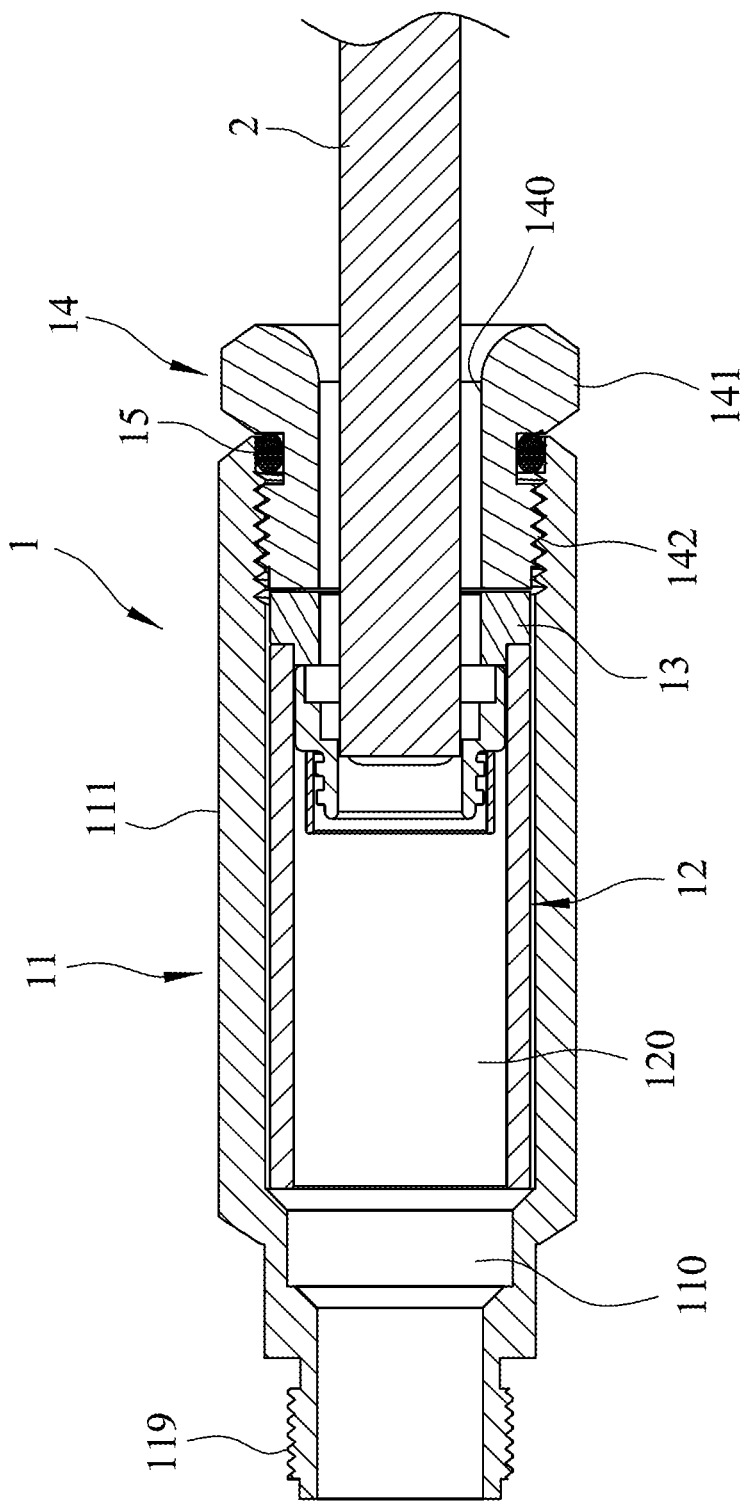
FIG. 2 is a fragmentary assembled sectional view of the conventional cable connecting assembly and the cable.
Figure 3:
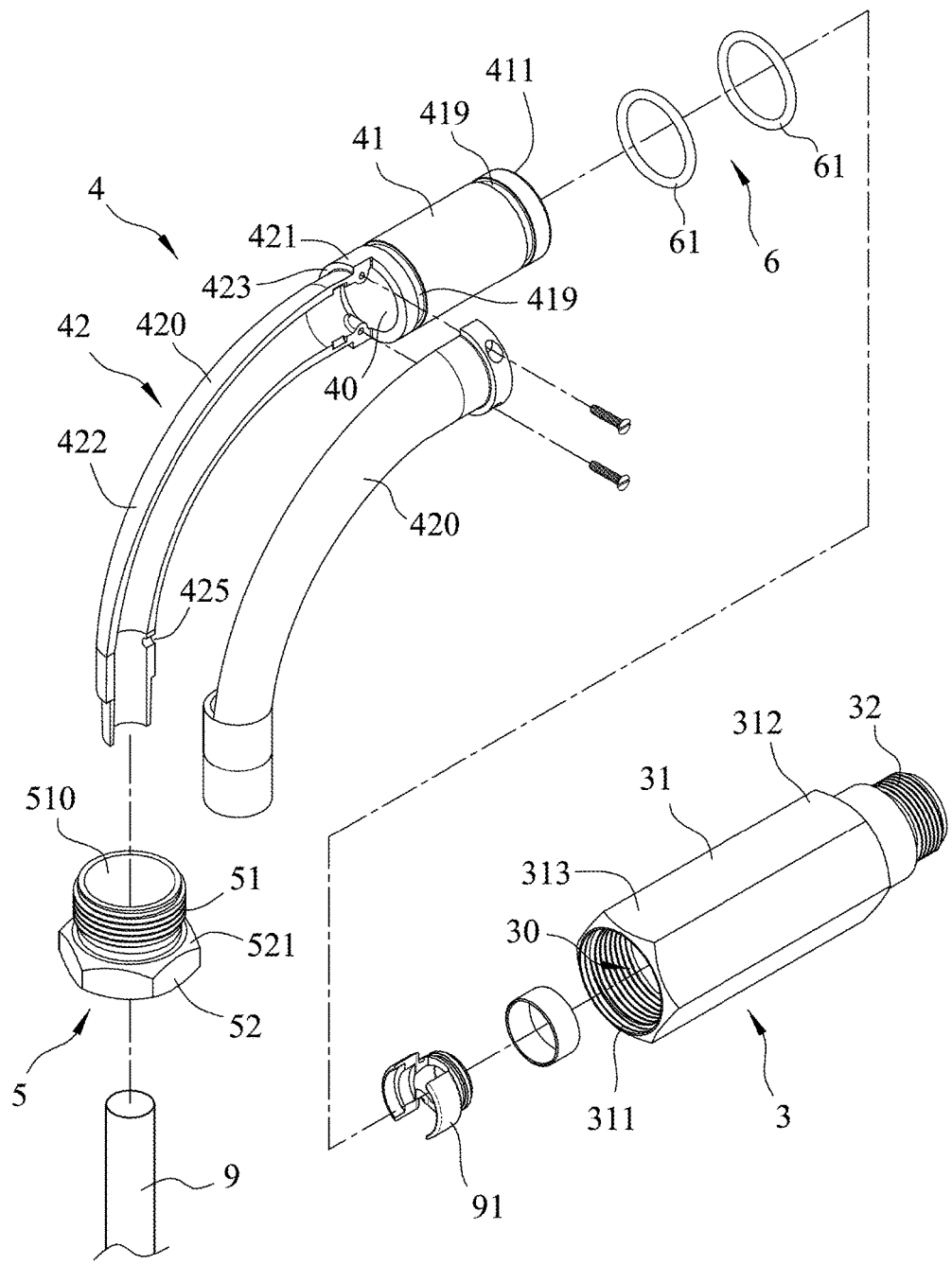
FIG. 3 is a fragmentary exploded perspective view illustrating an embodiment of a cable connecting assembly according to the disclosure and a cable.
Figure 4:
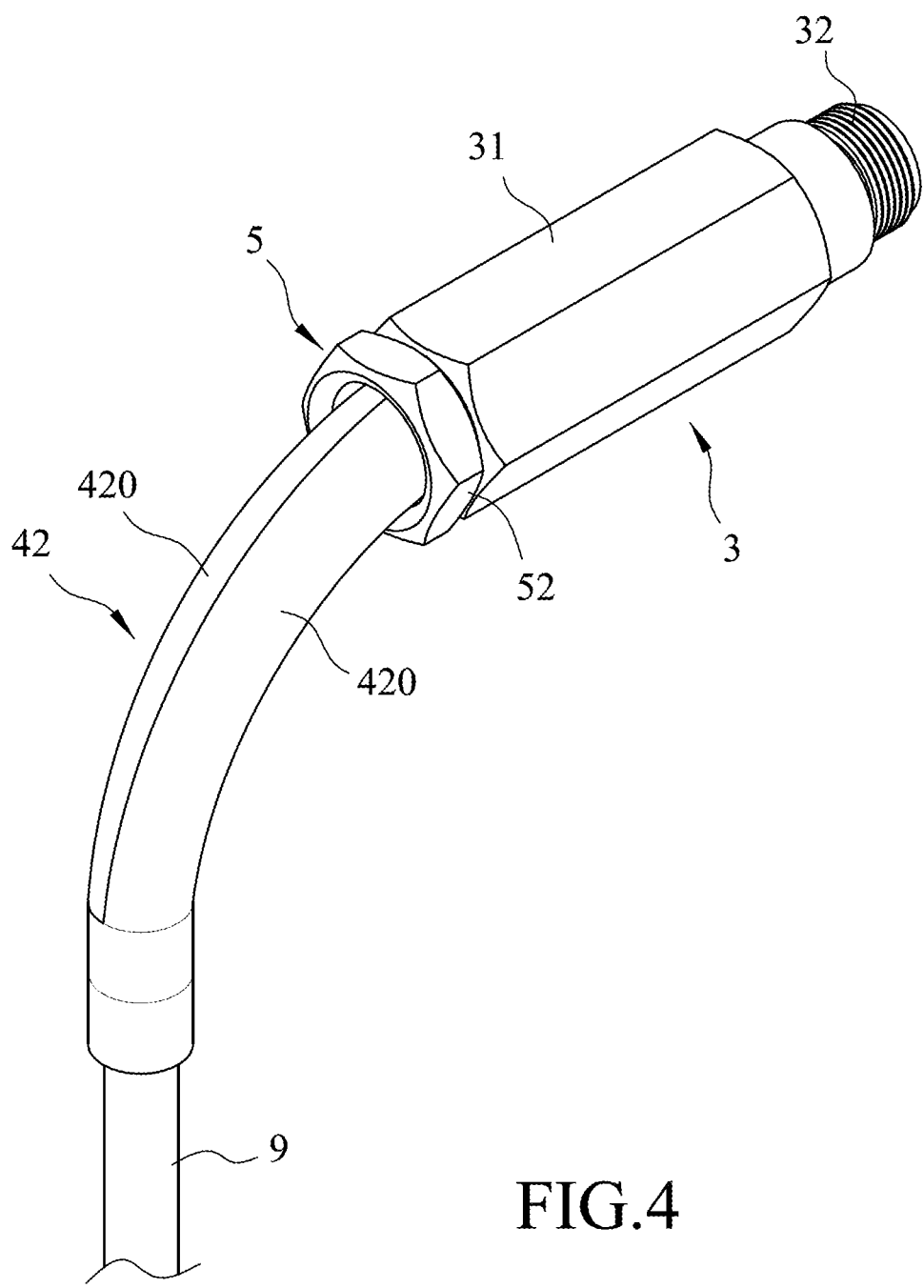
FIG. 4 is a fragmentary assembled perspective view illustrating the embodiment and the cable.
Figure 5:
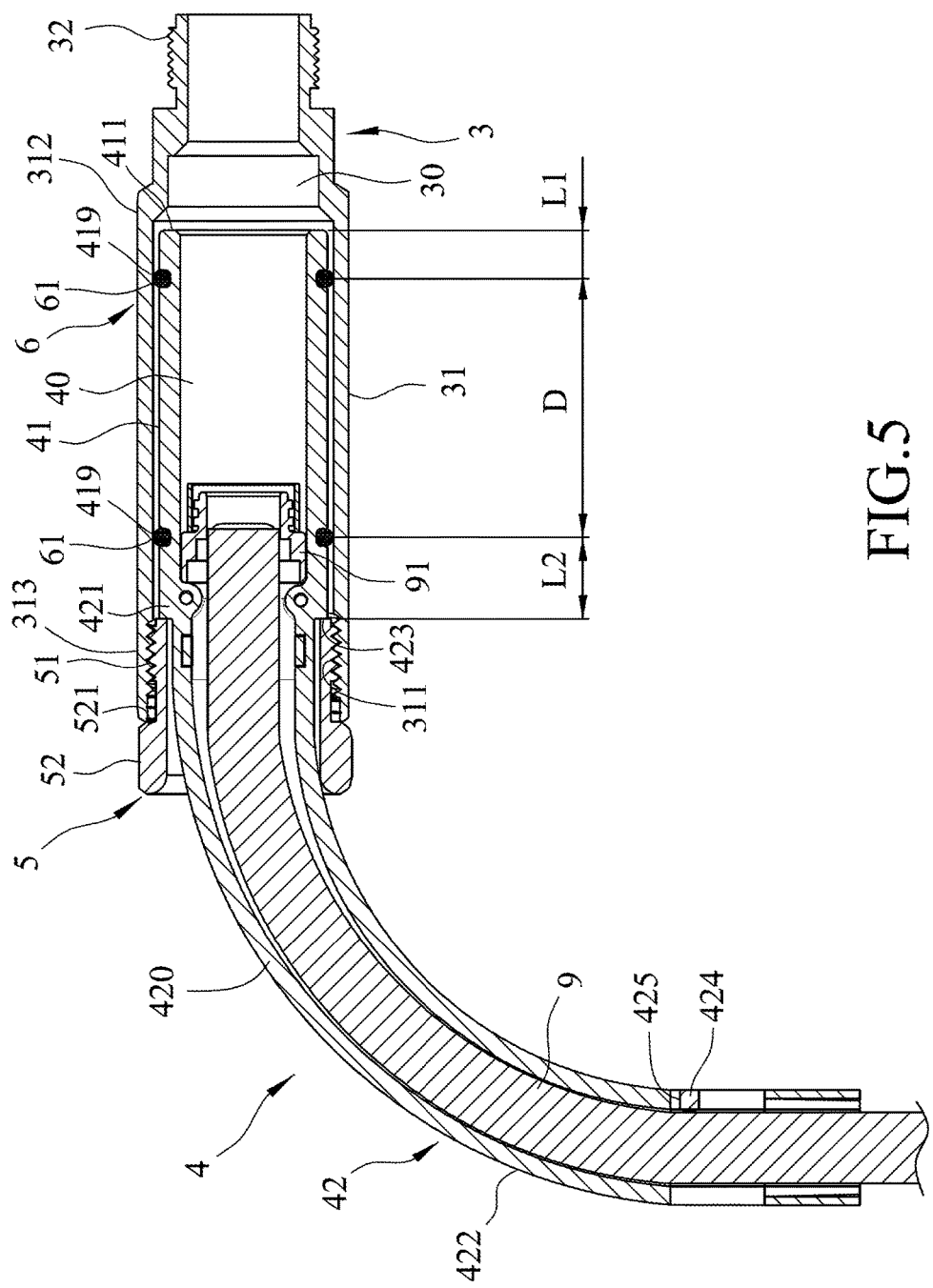
FIG. 5 is a fragmentary assembled sectional view illustrating the embodiment and the cable.

Referring to FIGS. 3 to 5, an embodiment of a cable connecting assembly according to the disclosure is used to be connected to a cable 9. The cable connecting assembly includes a barrel member 3, a tubular member 4, a securing member 5, and a seal unit 6.

The barrel member 3 defines an accommodating space 30 that extends in a lengthwise direction, and includes a main body 31 and an extending body 32. The main body 31 has a first end portion 312, and a second end portion 313 opposite to the first end portion 312 in the lengthwise direction and being formed with an internal thread 311. The extending body 32 extends from the first end portion 312 away from the second end portion 313, and has an outer surface formed with an external thread. The accommodating space 30 extends through the extending body 32 and the main body 31.

The tubular member 4 includes a head part 41 and a hollow tail part 42. The head part 41 defines a receiving space 40 adapted to receive an end portion of the cable 9 therein. The end portion of the cable 9 is adapted to be connected to another cable (not shown) via a connector 91 disposed in the receiving space 40, or is adapted to extend further through the barrel member 3 via the extending portion 32 to be connected to other device (e.g., a computer terminal) or another cable (not shown). Since such connection is well known to those skilled in the art and is not pertinent to the disclosure, further details of the same will not be described hereinafter.

The head part 41 of the tubular member 4 has an end surface 411 proximate to the extending body 32 of the barrel member 3, and an outer surface formed with two annular grooves 419 spaced apart from each other in the lengthwise direction. The tail part 42 is connected to an end of the head part 41, and is adapted for a neck portion of the cable 9 which is connected to the end portion to extend therethrough. The tail part 42 extends out of the main body 31 of the barrel member 3, and is curved to extend in a direction transverse to the lengthwise direction. In this embodiment, the tail part 42 is curved to extend in a direction perpendicular to the lengthwise direction (i.e., the orientations of opposite ends of the tail part 42 are perpendicular to each other).

In greater detail, the tail part 42 of the tubular member 4 has a connecting segment 421 integrally connected to the head part 41 of the tubular member 4, and a curved segment 422 connected to the connecting segment 421, having an outer diameter that is smaller than that of the connecting segment 421, and cooperating with the connecting segment 421 to form a shoulder 423 therebetween. As shown in FIGS. 3 and 4, the tail part includes two body halves 420 that are removably coupled to each other. Each of the body halves 420 of the tail part 42 constitutes a half of the connecting segment 421, a half of the curved segment 422, and a half of the shoulder 423. One of the body halves 420 of the tail part 42 includes a male engaging portion 424 (see FIG. 5), and the other one of the body halves 420 of the tail part 42 includes a female engaging portion 425 that removably engages the male engaging portion 424 so as to facilitate assembly of the body halves 420.

In this embodiment, the tail part 42 is made of metal to have a fixed curvature. In other embodiments, the tail part 42 may be made of a flexible material, e.g., rubber or plastic.

The securing member 5 has a coupling portion 51 and an abutment portion 52. The coupling portion 51 of the securing member 5 is sleeved on a portion of the curved segment 422 of the tail part 42 of the tubular member 4, abuts tightly against the shoulder 423 of the tail part 42 of the tubular member 4, and has an external thread threadedly engaging the internal thread 311 of the main body 31 of the barrel member 3. The abutment portion 52 is connected to the coupling portion 51, is located outside of the accommodating space 30, and has an abutment surface 521 transverse to the coupling portion 51 and abutting against the second end portion 313 of the main body 31 of the barrel member 3. Specifically, the abutment surface 521 is connected to the coupling portion 51, and is perpendicular to the coupling portion 51. The abutment portion 52 and the coupling portion 51 cooperatively form a through hole 510 extending in the lengthwise direction and permitting extension of the tail part 42 of the tubular member 4 therethrough.

The seal unit 6 includes two seal rings 61 that are respectively disposed in the annular grooves 419 of the tubular member 4 and that sealingly contact an inner surface of the main body 31 of the barrel member 3. As shown in FIG. 5, a distance (L1) between the end surface 411 of the head part 41 of the tubular member 4 and one of the seal rings 61 which is proximate to the end surface 411 in the lengthwise direction is smaller than a distance (D) between the seal rings 61, and a distance (L2) between the shoulder 423 of the tail part 42 and the other one of the seal rings 61 in the lengthwise direction is smaller than the distance (D) between the seal rings 61. That is, one of the seal rings 61 is proximate to the end surface 411 of the head part 41, and the other one of the seal rings 61 is proximate to the shoulder 423 of the tail part 42, thereby defining a relatively large gap between the main body 31 of the barrel member 3 and the head part 41 of the tubular member 4 which is sealed against fluid entry.

When the cable connecting assembly is used for connecting the cable 9, the end portion of the cable 9 which is to be connected to another cable or other device is inserted into the receiving space 40, followed by coupling of the two body halves 420 of the tail part 42 of the tubular member 4 via engagement between the male and female engaging portions 424, 425. The tail part 42 of the tubular member 4 provides protection to the cable 9 and guides extension of the cable 9 where bending of the cable 9 is required. By virtue of the design of the tail part 42 of the tubular member 4, operation of connecting the cable connecting assembly and the cable 9 can be performed effectively and efficiently since extra care is not required to prevent damage of the cable 9 when bending the cable 9, especially when the operation is conducted in a relatively small or narrow working space.

In addition, the coupling portion 51 of the securing member 5 tightly abuts against the shoulder 423 of the tail part 42 of the tubular member 4 after the coupling portion 51 of the securing member 5 and the second end portion 313 of the main body 31 of the barrel member 3 threadedly engage each other, which serves as a barrier against fluid entry into the accommodating space 30. In addition, the relatively large gap formed between the main body 31 of the barrel member 3 and the head part 41 of the tubular member 4 further prevent moisture or water from entering into the accommodating space 30 and the receiving space 40 in an effective manner.

In summary, by virtue of the tail part 42 of the tubular member 4 being constituted by the two body halves 420, the cable 9 can be quickly connected to the cable connecting assembly, thereby saving time for the connecting operation. When the cable connecting assembly is used for connecting the cable 9 in a working space where bending of the cable 9 is required, the tail part 42 provides support and protection to the cable 9 and prevents the cable 9 from damage due to bending, thus the installation process in the working space is facilitated. By the design of the head and tail parts 41, 42 of the tubular member 4 in combination with the seal unit 6, the cable 9 is effectively prevented from damage caused by bending and water contact.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A cable connecting assembly for being connected to a cable, said cable connecting assembly comprising:
   a barrel member defining an accommodating space that extends in a lengthwise direction, and including
      a main body that has a first end portion, and a second end portion opposite to said first end portion in the lengthwise direction and being formed with an internal thread, and
      an extending body that extends from said first end portion away from said second end portion, said accommodating space extending through said extending body and said main body;
   a tubular member including
      a head part that defines a receiving space adapted to receive an end portion of the cable therein, and that has an outer surface formed with two annular grooves spaced apart from each other in the lengthwise direction, and
      a hollow tail part that is connected to an end of said head part, that is adapted for a neck portion of the cable which is connected to the end portion to extend therethrough, and that is curved to extend in a direction transverse to the lengthwise direction, said tail part including two body halves that are removably coupled to each other;
   a securing member having
      a coupling portion that has an external thread threadedly engaging said internal thread of said main body of said barrel member, and that abuts against said tubular member, and
      an abutment portion that is connected to said coupling portion, that is located outside of said accommodating space, that abuts against said second end portion of said main body, and that cooperates with said coupling portion to form a through hole extending in the lengthwise direction and permitting extension of said tail part of said tubular member therethrough; and
   a seal unit including two seal rings that are respectively disposed in said annular grooves of said tubular member and that sealingly contact an inner surface of said main body of said barrel member.

2. The cable connecting assembly as claimed in claim 1, wherein:
   said tail part of said tubular member has a connecting segment connected to said head part of said tubular member, and a curved segment connected to said connecting segment, having an outer diameter that is smaller than that of said connecting segment, and cooperating with said connecting segment to form a shoulder therebetween;
   said coupling portion of said securing member is sleeved on a portion of said curved segment and abuts against said shoulder; and
   each of said body halves of said tail part constitutes a half of said connecting segment, a half of said curved segment, and a half of said shoulder.

3. The cable connecting assembly as claimed in claim 2, wherein:
   said head part of said tubular member has an end surface proximate to said extending body of said barrel member;
   a distance between said end surface of said head part and one of said seal rings which is proximate to said end surface in the lengthwise direction is smaller than a distance between said seal rings; and
   a distance between said shoulder of said tail part and the other one of said seal rings in the lengthwise direction is smaller than the distance between said seal rings.

4. The cable connecting assembly as claimed in claim 2, wherein said abutment portion of said securing member has an abutment surface transverse to said coupling portion and abutting against said second end portion of said main body of said barrel member.

5. The cable connecting assembly as claimed in claim 1, wherein one of said body halves of said tail part includes a male engaging portion, and the other one of said body halves of said tail part includes a female engaging portion that removably engages said male engaging portion so as to facilitate assembly of said body halves.

6. The cable connecting assembly as claimed in claim 1, wherein said tail part is made of metal.

7. The cable connecting assembly as claimed in claim 1, wherein said tail part is made of a flexible material.

* * * * *